United States Patent [19]

Yoshioka

[11] Patent Number: 4,725,824
[45] Date of Patent: Feb. 16, 1988

[54] DOZE PREVENTION SYSTEM

[75] Inventor: Hideaki Yoshioka, Amagasaki, Japan

[73] Assignee: Mitsubishi Denki Kabushiki Kaisha, Tokyo, Japan

[21] Appl. No.: 934,098

[22] Filed: Nov. 24, 1986

Related U.S. Application Data

[63] Continuation-in-part of Ser. No. 620,747, Jun. 14, 1984.

[30] Foreign Application Priority Data

Jun. 15, 1983 [JP] Japan ................ 58-108619

[51] Int. Cl.$^4$ .............................................. G08B 23/00
[52] U.S. Cl. ...................................... 340/575; 340/576; 128/733
[58] Field of Search .................. 340/576, 577, 52 D; 128/733

[56] References Cited

U.S. PATENT DOCUMENTS

| | | | |
|---|---|---|---|
| 3,889,251 | 6/1975 | Litman | 340/575 X |
| 4,144,531 | 3/1979 | Anbergen | 340/575 |
| 4,155,352 | 5/1979 | Toglia et al. | 128/733 |
| 4,359,724 | 11/1982 | Zimmerman | 340/575 |
| 4,496,938 | 1/1985 | Seko et al. | 340/575 |

Primary Examiner—James L. Rowland
Assistant Examiner—Jeffery A. Hofsass
Attorney, Agent, or Firm—Bernard, Rothwell & Brown

[57] ABSTRACT

A system for alerting a worker who is falling into a doze records a parameter pattern or range derived from a plurality of eyeblink pulses in a waveform generated during an awake-state period, and then determines excessive deviation of parameters of each succeeding eyeblink pulse from the recorded pattern to generate an alarm signal.

5 Claims, 9 Drawing Figures

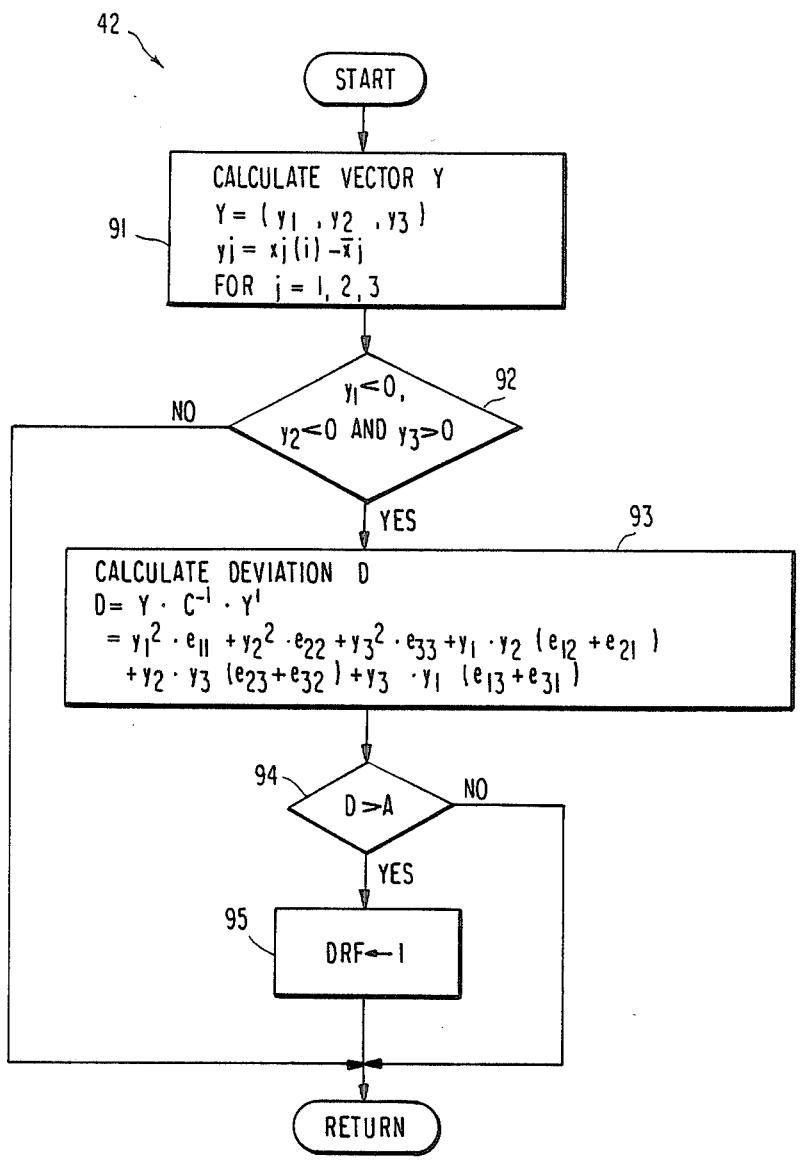

DOZE PREVENTION SYSTEM

CROSS-REFERENCE TO RELATED APPLICATION

This application is a continuation-in-part of copending U.S. application Ser. No. 620,747, filed June 14, 1984, which is incorporated herein by reference.

BACKGROUND OF THE INVENTION

1. Field of the Invention

The present invention relates to a doze prevention system used for drivers of vehicles, operators of radar monitoring stations, and the like, wherein the waveform of eyeblink of the operator is analyzed to detect a "sleepiness" state so that the operator is alerted by an acoustic alarm signal upon detection of a certain waveform before the operator falls into a doze.

2. Description of the Prior Art

One prior art drowsiness alarm system is shown in FIG. 1. The system includes a steering handle 10 of a vehicle or the like operated by a driver 11 of the vehicle, a steering angle detector 12, an awake-state pattern generator 13, a comparator 14 which compares the pattern of the current steering operation with the pattern in an awake state provided by the pattern generator 13, and an alert device 15 which produces an acoustic alarm signal in response to the output of the comparator 14.

The operation of the foregoing system will be described in the following. During a normal drive of a vehicle by the driver 11 in awake condition, small steering operations take place uninterruptedly even if the vehicle is driven on a straight course. The steering operations are detected by the steering angle detector 12, and the number of steering operations in unit time length, e.g., one minute, and the angle of each operation are recorded as an awake-state pattern of operation by the awake-state pattern generator 13. If the driver has entered a "sleepiness" condition or even has fallen into a doze, the steering operation becomes coarse and the number of steering operations decrease. Consequently, such a driver's condition appears as a decrease in the number of steering operations and an increase in the steering angle operated at each operation. The system is operated during a run of the vehicle so as to measure the steering angle by the detector 12 and count the number of steering operations in unit time length, and these values are compared by the comparator 13 with the reference values of the awake condition which have been determined in advance by the awake-state pattern generator 13. If an operational pattern specific to "doze driving" as mentioned above is detected, the comparator 14 issues a command to the alert device 15, which in turn produces an acoustic alarm signal so as to make the driver aware of the drowsy condition.

U.S. Pat. No. 4,359,724 discloses another alertness detecting system wherein the interval between successive eyeblink pulses in an eyeblink waveform is monitored, and if excessive, results in sounding an alarm.

The foregoing conventional doze prevention systems, however, do not operate satisfactorily to detect the driver's critical mental condition in a practical sense due to different individual behaviors of steering operation and eyeblink intervals by each driver. In addition, these conventional systems have a serious drawback that acoustic alarms are produced only after extended delays during which an accident or events leading to an accident could already have occurred.

SUMMARY OF THE INVENTION

It is an object of the present invention to provide a doze prevention system which detects a sleepiness state of the operator before falling into a doze and issues an alarm signal so as to ensure the prevention of the operator from falling into a doze.

The invention is summarized in a doze prevention system wherein parameters of eyeblink pulses in a waveform from an eyeblink sensor are detected, and used initially to generate an awake-state parameter pattern or range during an awake-state period. Deviations of parameters of subsequent eyeblink pulses from the awake-state parameter pattern result in the operation of an alarm.

The inventive system for detecting the pre-doze state based on the comparison of an eyeblink waveform pattern with an initially determined awake state is superior fundamentally to the conventional system based on the pattern of steering operation as described in connection with FIG. 1, in that the inventive system is automatically adapted to individual different characteristics and behaviors of operators.

BRIEF DESCRIPTION OF THE DRAWINGS

FIG. 9 is a detailed step diagram of a deviation comparison routine of FIG. 3.

DESCRIPTION OF THE PREFERRED EMBODIMENTS

Figure 1:
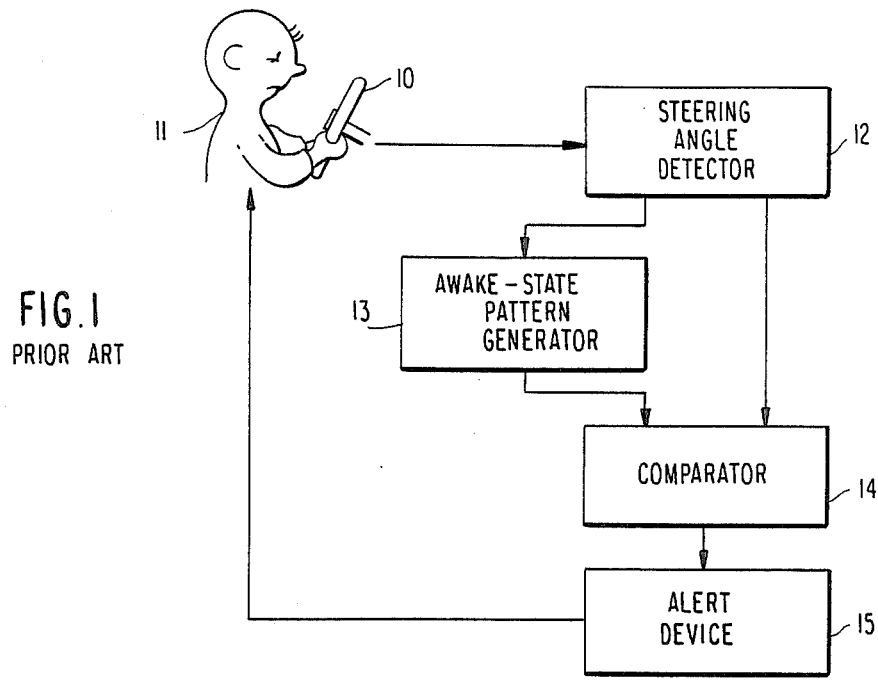
FIG. 1 is a block diagram showing the conventional doze prevention system.
Figure 2:
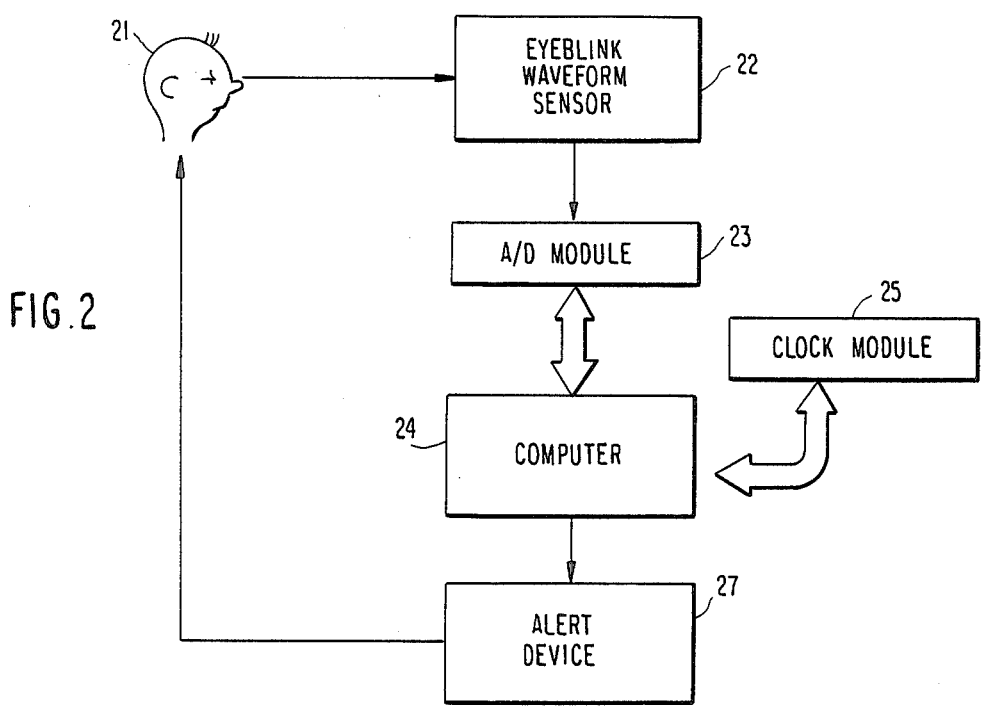
FIG. 2 a block diagram showing the doze prevention system according to the present invention.

As illustrated in FIG. 2, one embodiment of a hardware configuration of a doze prevention system constructed in accordance with the invention includes an eyeblink waveform sensor 22 of conventional type such as an electrode and preamplifier arrangement (not shown) sensing electrical impulses produced by eyeblinks, an A/D module 23, a computer 24, a clock module 25 and an alert or alarm device 27. The eyeblink waveform sensor 22 generates the waveform of eyeblink in conventional manner and sends an output of the waveform thus generated to the A/D module 23 where the analog signal from the sensor 22 is converted into digital signals. The computer 24 controls the A/D converter 23 to read and process the digital signals at a rate controlled by the clock module 25. When an eyeblink waveform indicating a sleepy condition is detected by the computer 24, the alarm 27 is operated.

Figure 3:
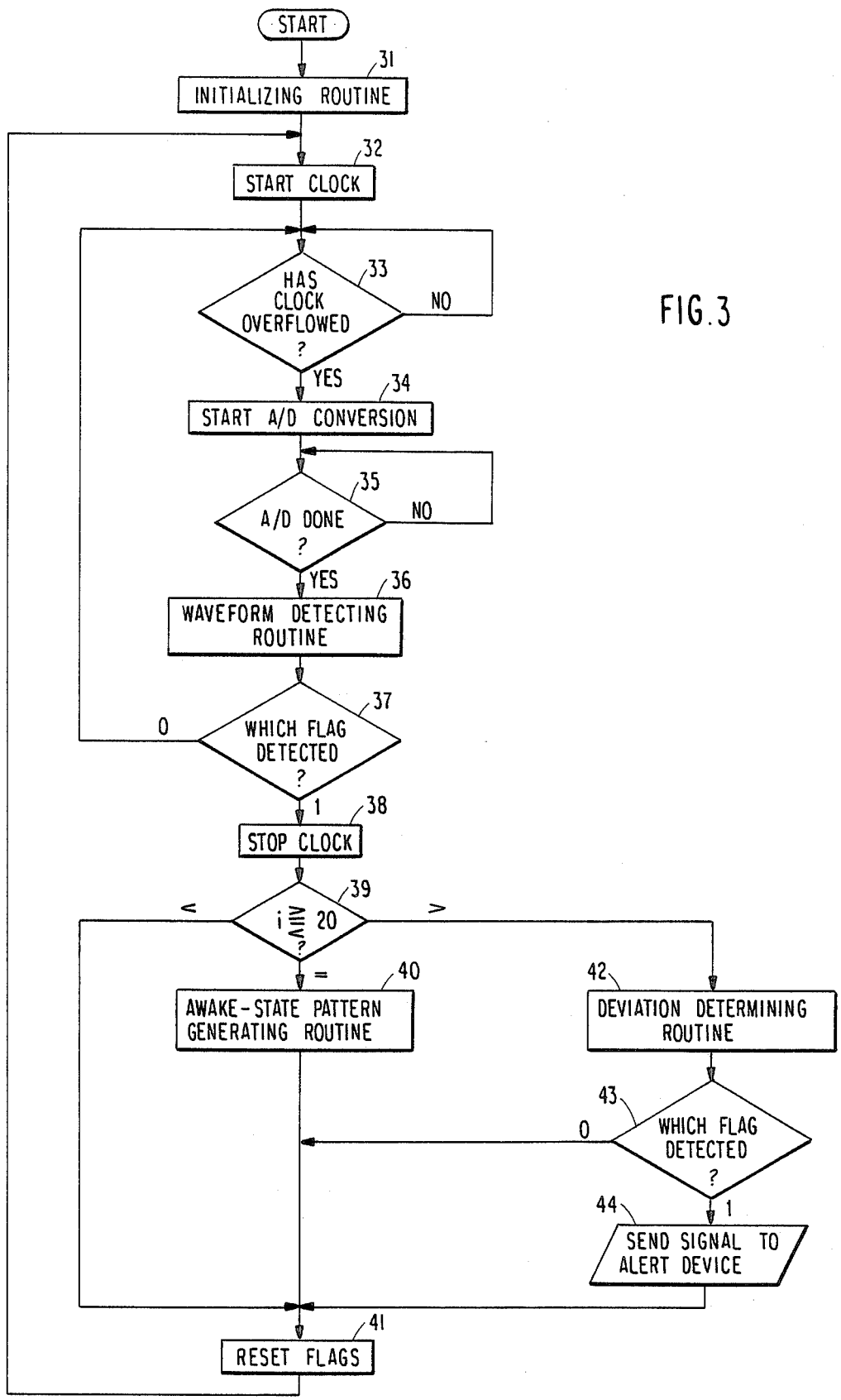
FIG. 3 is a step diagram of a program employed in a computer in the system of FIG. 2.
Figure 4:
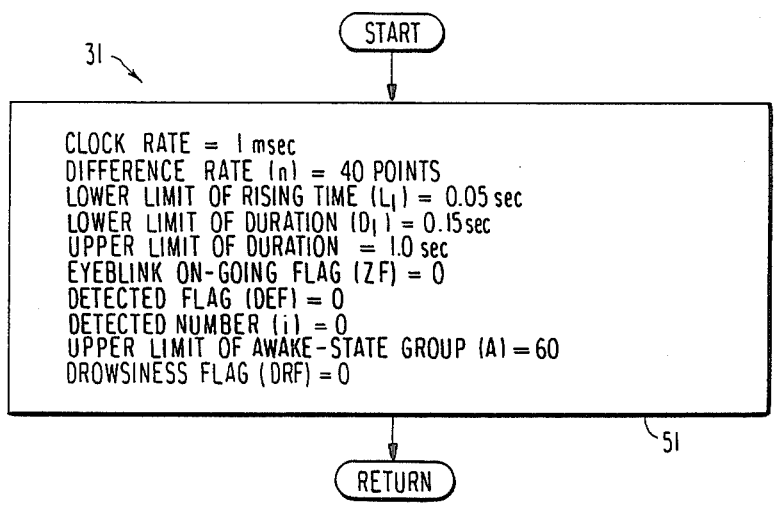
FIG. 4 is a more detailed step diagram of a portion of an initializing routine in FIG. 3.

The operation of the computer 24 is performed according to a prescribed program as shown in FIG. 3. Step 31 is an initializing routine wherein an initialization of the computer 24 is performed including the setting or resetting of various rates, limits, counts, and flags as shown in step 51 of FIG. 4. After completion of the initializing routine, the clock in the clock module 25 is started (step 32). Then after a time interval determined by means of the clock module 25 reaching a predetermined count, e.g., overflowed to zero count, at step 33, the computer 24 proceeds to steps 34 and 35 to fetch the output from the eyeblink waveform sensor 27 by operating the A/D module 23 to convert the analog value from sensor 22 to a digital value. The time interval of the clock module 25 is sufficiently short, for example, 1 millisecond, that a plurality of readings of the A/D module 23 are made during each eyeblink so that the parameters of the eyeblink waveform can be accurately determined. In the waveform detecting routine, step 36, as will be described below in more detail, the computer determines when a series of readings indicate that an eyeblink waveform has been received, and, if so, sets the eyeblink detected flag and increments a count i of the number of detected waveforms. In the absence of the eyeblink detected flag in step 37, the computer continues to cycle through steps 33–37 until an eyeblink waveform is detected, the steps 34–37 being performed in a time interval less than the clock interval. Once an eyeblink waveform is detected (step 37), the computer stops the clock (step 38) and performs the next processing.

In step 39, the computer program branches to step 40, step 41, or step 42, depending upon whether the number i of the detected eyeblink waveforms is equal to, less than, or greater than, respectively, a predetermined value, for example, 20. When the number i is smaller than 20, the computer proceeds to the flag resetting step 41 so that the computer collects and stores parameters of twenty eyeblinks. In the awake-state pattern generating routine 40 called when i equals 20, the mean value and the variance or critical deviation, such as a covariance matrix and an inverse covariance matrix, of the waveform parameters are calculated to determine the awake-state pattern before proceeding to the flag resetting step 41. In the deviation determining routine 42 called when i is greater than 20, a deviation from the mean value is calculated for each eyeblink following the twentieth eyeblink, and if this deviation exceeds the critical deviation a drowsiness flag is set to 1. When the drowsiness flag is 0 indicating that the deviation is less than the limit, the program in step 43 proceeds to the flag resetting step 41. When the drowsiness flag is 1, the program branches to step 44 where a signal is sent to the alert device or alarm 27 before proceeding to flag resetting step 41. The detected flag and the drowsiness flag are reset at 0 at step 41. Then the process returns to step 32 to restart the procedure to detect the next eyeblink.

Figure 5:
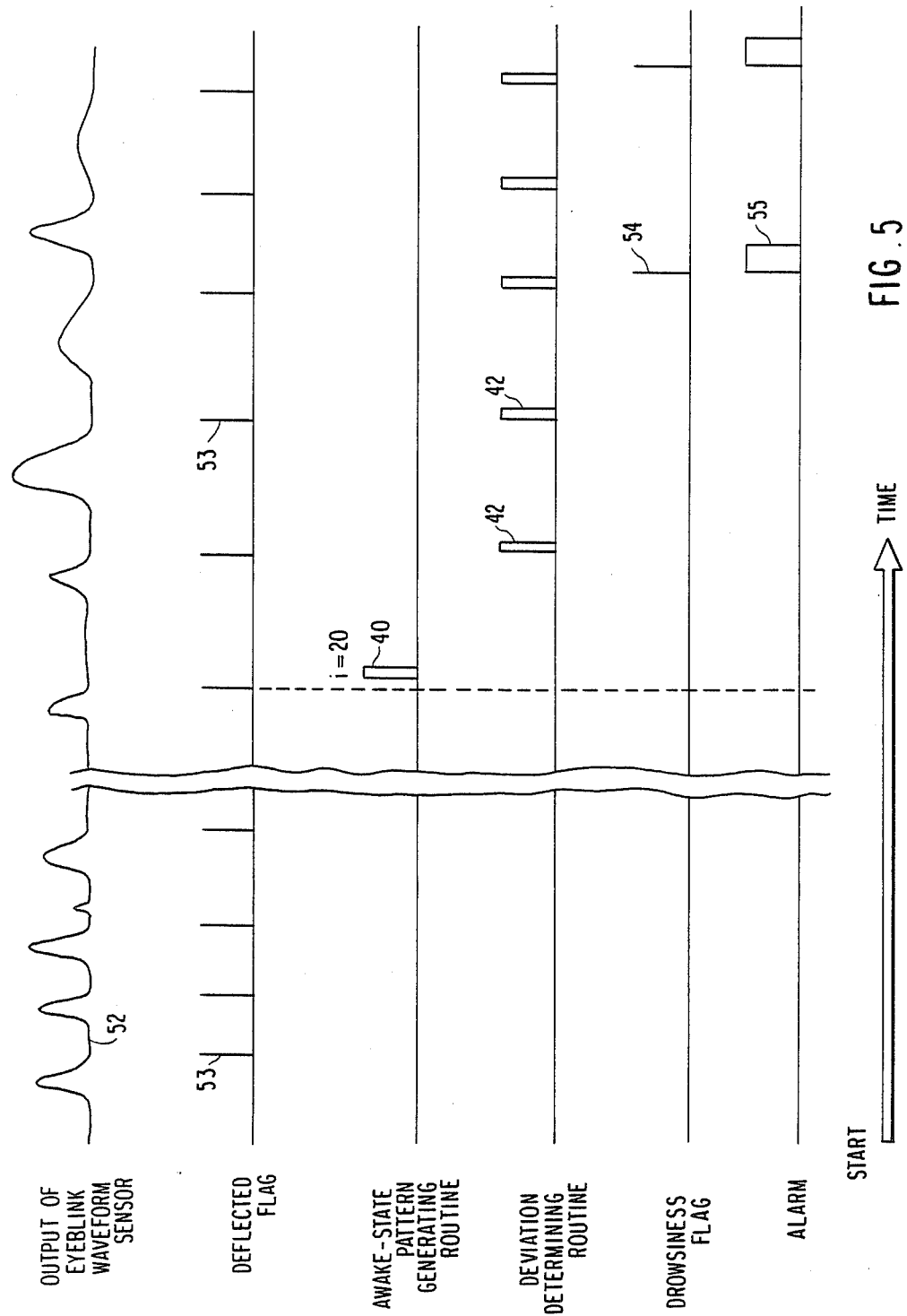
FIG. 5 is a waveform chart illustrating a series of detected eyeblink waveforms and corresponding operations of various parts of the system of FIGS. 2 and 3.

In FIG. 5 is shown a timing chart of the process performed in the computer 24. Waveform 52 is a typical waveform of the eyelid activity as produced on the output of the eyeblink waveform sensor 22. The detected eyeblink flag signal 53 is generated when each eyeblink is detected. The awake-state pattern generating routine 40 is performed when the twentieth eyeblink is detected. After the twentieth eyeblink, the deviation determining routine 42 is performed for each detected eyeblink. A drowsiness flag 54 is generated and an alarm signal 55 is sounded when the deviation determined in each routine 42 is found greater than the critical deviation found in routine 40.

Figure 7:
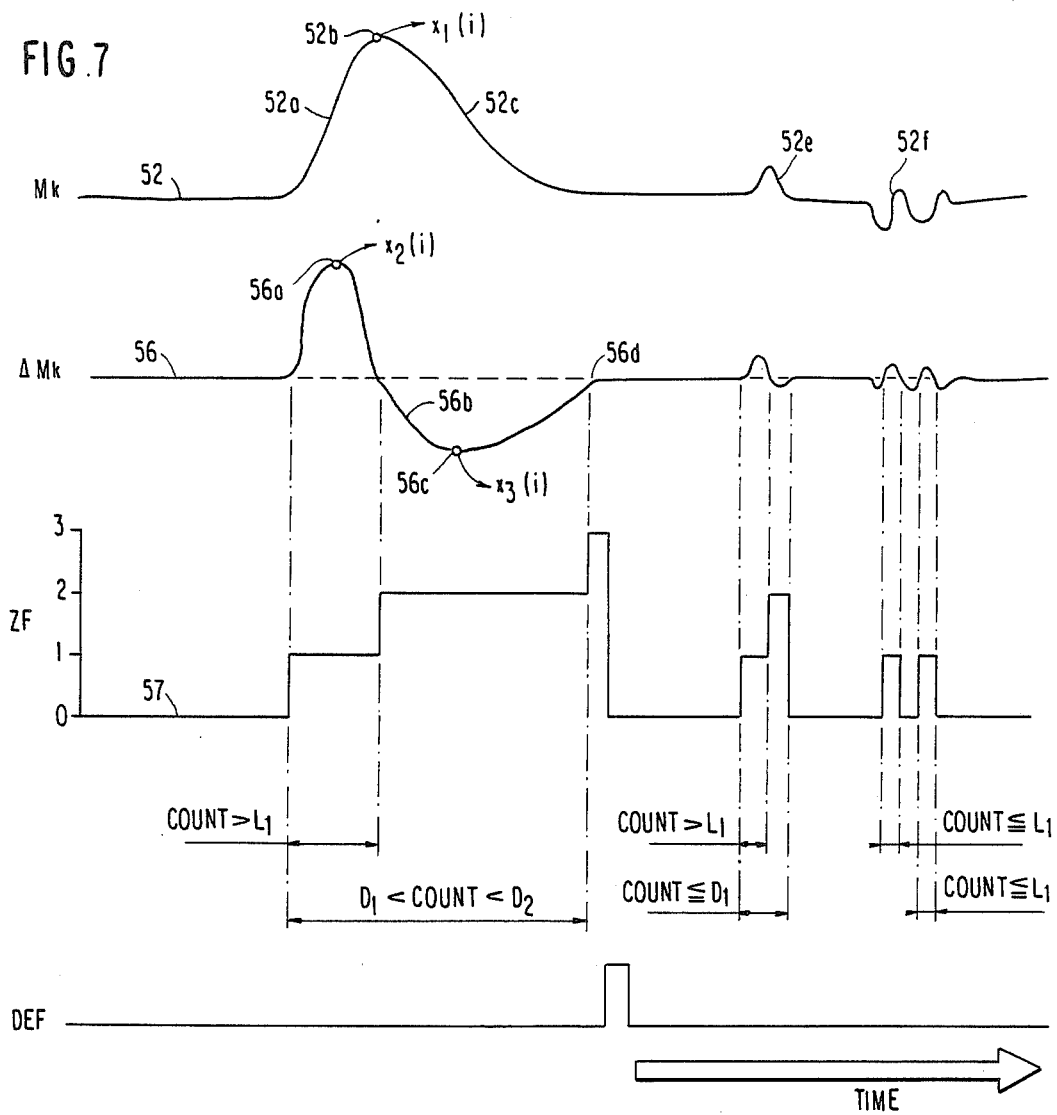
FIG. 7 is a waveform chart illustrating detection of eyeblink waveforms by the procedure of FIG. 6.
Figure 6:
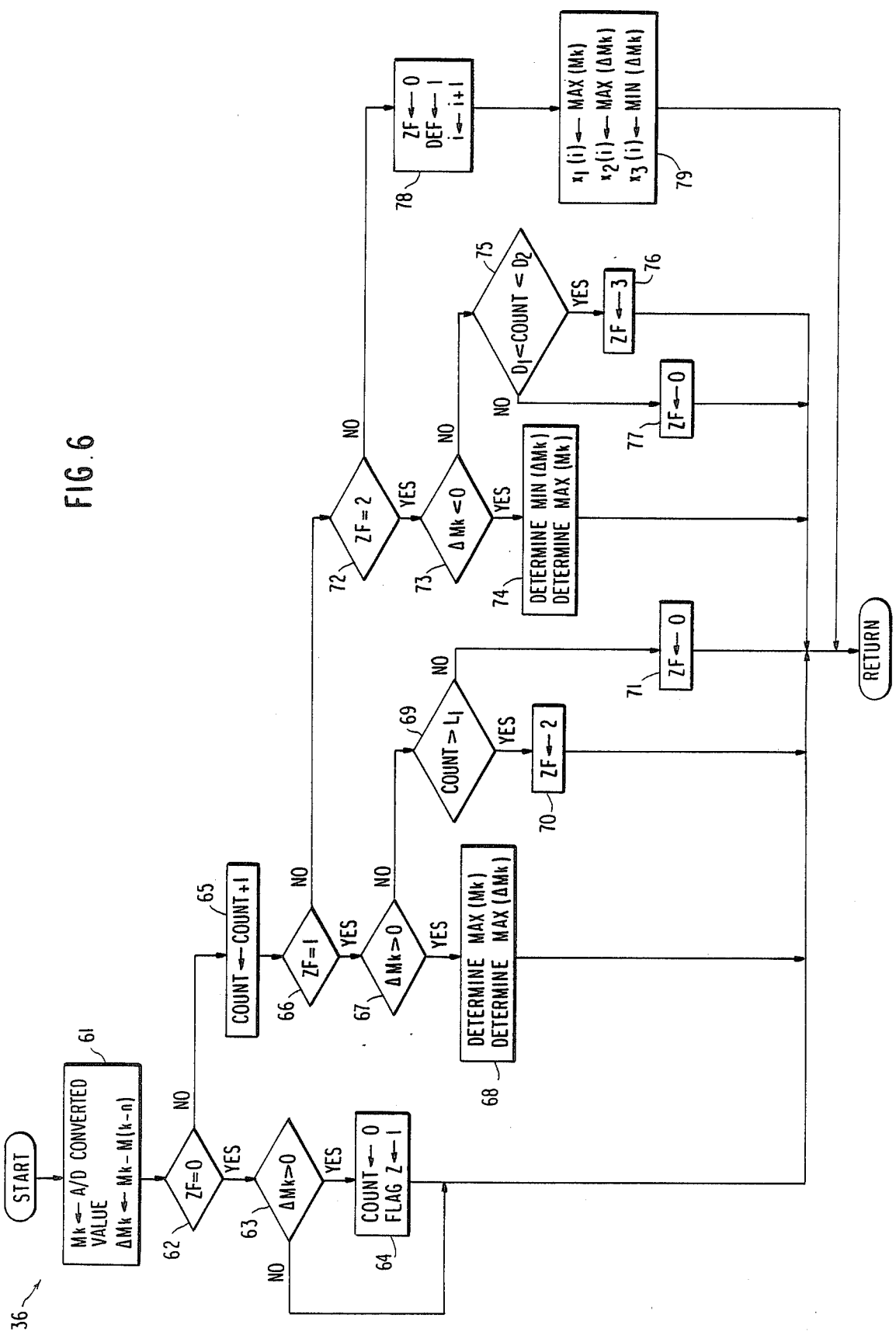
FIG. 6 is a detailed step diagram of a waveform detecting routine step in FIG. 3.

The details of the waveform detecting routine of step 36 are shown in FIGS. 6 and 7. In this routine, each new A/D converted value at time k is expressed as Mk, and, as an example, has a value which defines a point on curve 52 in FIG. 7. The previous A/D converted value generated at time k−n is stored in a memory of the computer 24 as M(k−n). The difference between the values at each time k and at corresponding time (k−n) is computed as $\Delta Mk$ in step 61 and has a value, for example, defining a point on curve 56. An eyeblink on-going flag ZF, see 57 in FIG. 7, is used to control the eyeblink detecting routine during successive cycles. When flag ZF is 0, the waveform is indicating no activity. A flag ZF of 1 indicates that the waveform is increasing. A flag ZF of 2 indicates that the waveform is decreasing after a predetermined period (number of cycles) of waveform increase. A flag ZF of 3 is generated at the end of a waveform decrease period (ZF=2) within a predetermined range to indicate that an eyeblink waveform has been generated.

For each reading Mk where $\Delta Mk \leq 0$ while ZF=0 indicating that no eyeblink waveform is being sensed, the program proceeds through steps 62 and 63 to return to the main program of FIG. 3. When the waveform 52, FIG. 7, begins to increase as shown at 52a, $\Delta Mk$ as shown by waveform 56 becomes greater than 0 causing step 64 to reset the cycle count to 0 and to set the flag ZF to 1. While ZF is greater than 0 the program branches at each cycle to step 65 where the cycle count is incremented. While flag ZF remains equal to 1 in step 66 and $\Delta Mk$ remains greater than 0 in step 67, the program in cycling through step 68 determines the maximum Mk and maximum $\Delta Mk$ for each eyeblink pulse. During a first pass through step 68 or during step 64, the values max (Mk) and max ($\Delta Mk$) are set to 0 or to the initial present values Mk and $\Delta Mk$. Thereafter during subsequent passes or cycles, the program in step 68 stores the present $\Delta Mk$ as the maximum $\Delta Mk$ when the present $\Delta Mk$ is greater than the previously stored maximum $\Delta Mk$, and the program stores the present Mk as the maximum Mk when the present Mk is greater than the previously stored maximum Mk. The value $\Delta Mk$ 56 reaches its maximum 56a when the rate of increase or rising slope 52a is greatest. After the increasing eyeblink waveform 52 reaches its maximum 52b and begins to decrease 52c, $\Delta Mk$ becomes negative, see 56b. This causes the program in step 67 to branch to step 69 where the cycle count is compared with a predetermined number $L_1$, which indicates the minimum rise time (for example, 0.05 sec.) of an eyeblink pulse. When the count is greater than $L_1$, the program proceeds to step 70 where flag ZF is set to 2, and when the count is less than or equal to $L_1$, the program branches to step 71 where the flag ZF is reset to 0 to indicate that the incoming pulse is not an eyeblink pulse, for example see pulse 52f.

While flag ZF is 2, the program branches at step 66 to step 72 and then to step 73 where the program proceeds to step 74 when $\Delta Mk$ is less than 0. During the subsequent passes through step 74, the minimum value of $\Delta Mk$, i.e., the largest negative magnitude of $\Delta Mk$, is determined for each eyeblink pulse. In the first pass or in the step 70, the value min ($\Delta Mk$) is reset to zero or the initial negative value of $\Delta Mk$. Thereafter in subsequent passes through step 74, the value $\Delta Mk$ is stored as the minimum $\Delta Mk$ when the present $\Delta Mk$ is less than, i.e., has a larger negative magnitude, the previous stored minimum $\Delta Mk$. The value $\Delta Mk$ is minimum $56c$ when the magnitude of rate of decrease or falling slope $52c$ is greatest. When $\Delta Mk$ is no longer less than 0 at point $56d$ indicating that Mk is no longer decreasing, the program at step 73 branches to step 75 where the count is compared with a predetermined range of values $D_1$ to $D_2$ which correspond to the range of length or duration (for example 0.1 sec. to 1 sec.) of eyeblink pulses, pulses with durations shorter or longer than this range are not considered to be eyeblink pulses, for example, see pulse $52e$. If the pulse is in the range of acceptable durations, the flag ZF is set to 3 in step 76, and if the pulse duration is not in the acceptable range, the flag ZF is set to zero in step 77.

Upon the next cycle after ZF has been set to 3, the program proceeds to step 78 where the flag ZF is returned to 0, the flag DEF is set to 1 to indicate that an eyeblink has been detected, and the count i of the number of eyeblinks is incremented. Then in step 79, the eyeblink parameters of maximum Mk, maximum $\Delta Mk$ and minimum $\Delta Mk$ are stored in memory as $x_1(i)$, $x_2(i)$ and $x_3(i)$, respectively, at an indexed location corresponding to the i-th eyeblink.

Figure 8:
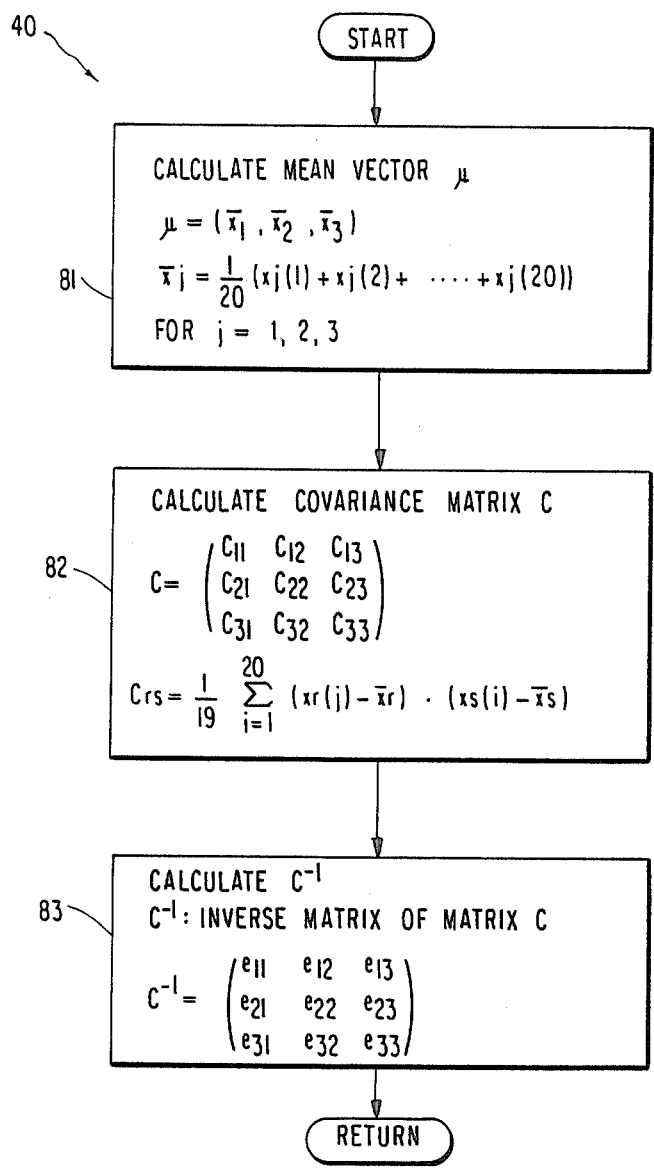
FIG. 8 is a detailed step diagram of a mean awake-state pattern and critical deviation generating routine of FIG. 3.

FIG. 8 shows the details of the awake-state pattern generating routine at step 40 in FIG. 3, which includes steps 81–83. From the stored waveform parameters $x_1(i)$, $x_2(i)$, and $x_3(i)$ for the first 20 eyeblink waveforms, mean values $\bar{x}_1, \bar{x}_2$ and $\bar{x}_3$, respectively, are calculated. At step 81 these three mean values are expressed as mean vector $\mu$. Then, a covariance matrix C is calculated as shown by the conventional formula in step 82. In step 83 an inverse matrix $C^{-1}$ is calculated.

When C is $$C = \begin{pmatrix} c_{11}, c_{12}, c_{13} \\ c_{21}, c_{22}, c_{23} \\ c_{31}, c_{32}, c_{33} \end{pmatrix}$$

the inverse matrix $C^{-1}$ is expressed by:

$$C^{-1} = \frac{1}{c_{11}c_{22}c_{33} + c_{12}c_{23}c_{31} + c_{13}c_{21}c_{32} - c_{11}c_{23}c_{32}C - c_{12}c_{21}c_{23} - c_{13}c_{22}c_{31}} \times \begin{pmatrix} c_{22}c_{33} - c_{32}c_{23} & c_{12}c_{33} - c_{32}c_{13} & c_{12}c_{33} - c_{22}c_{13} \\ c_{21}c_{33} - c_{31}c_{23} & c_{11}c_{33} - c_{31}c_{13} & c_{12}c_{23} - c_{21}c_{13} \\ c_{21}c_{32} - c_{31}c_{22} & c_{11}c_{32} - c_{31}c_{12} & c_{11}c_{22} - c_{21}c_{12} \end{pmatrix}$$

The calculation procedures for obtaining the means value, the covariance matrix and the inverse covariance matrix are substantially the same as those used in well known mathematical procedures for calculating mean values, covariance matrices, and inverse covariance matrices from other multiple parameter data samples. The covariance matrix and the inverse covariance matrix are conventional expressions of a standard or critical deviation within a sample group of multiple term or vector parameters.

The details of the deviation comparing routine at step 42 of FIG. 3 is shown in FIG. 9. In step 91 the deviation of the present eyeblink parameters $x_1(i)$, $x_2(i)$ and $x_3(i)$ from the respective mean values $\bar{x}_1$, $\bar{x}_2$ and $\bar{x}_3$ found in step 81 is calculated and expressed as a vector Y having the corresponding deviation values, $Y_1$, $Y_2$ and $Y_3$. The vector Y thus obtained is then examined in step 92 whether or not the vector Y is in the direction of drowsiness; i.e., the peak present waveform value must be smaller, the present waveform rising slope must be less, and the present waveform falling slope must be greater than the corresponding mean values in order for the vector Y to be on the side of drowsiness. When one or more of the compared conditions are false, step 92 is false indicating that no drowsiness is detected and the program returns to step 43 in FIG. 3 with the flag DRF equal to 0. If step 92 yields a true, the program goes to step 93, where a deviation D of the vector Y is calculated using the inverse covariance matrix of step 83 as shown in the illustrated formula in FIG. 9. The value D is similar to that referred to in statistics as "the Mahalanobis generalized distance", and is an expression of a comparison or ratio between the covariance matrix and the deviation of the vector Y from vector U. The value D becomes zero when vector Y equals the mean vector U of the eyeblink waveform parameters at the awake-state, while it becomes larger as the vector Y increasingly differs from the mean vector.

In the next step 94 following step 93, the deviation D is compared with the preset value A, and if larger, the drowsiness flag DRF is set at 1 in step 95. The value A is set, for example, at 60, at step 51 as an upper deviation limit value of the eyeblink from the awake-state. From step 94 if D is less than A, or from step 95, the program returns to step 43 in FIG. 3.

Since many variations, modification and changes in detail may be made to the above-described embodiment without departing from the scope and spirit of the invention, it is intended that all matter described above and shown in the accompanying drawings be interpreted as illustrative and not in a limiting sense.

What is claimed is:

1. A doze prevention system comprising:
   eyeblink sensor means for generating a waveform of eyeblink activity of an operator;
   eyeblink detecting means connected to said eyeblink sensor means for detecting eyeblink pulses in said waveform and for extracting at least one inherent attribute of each eyeblink pulse as a parameter;
   awake-state pattern generating means responsive to said eyeblink detecting means detecting a plurality of eyeblink pulses during an awake-state period for determining and recording an awake-state parameter pattern from the extracted parameters of the awake-state plurality of eyelink pulses;
   deviation determining means responsive to said eyeblink detecting means detecting an eyeblink pulse during a monitor-for-doze period after the awake-state period for determining a deviation of the extracted parameter of the monitor-for-doze eyeblink pulse from the awake-state parameter pattern to generate an output; and
   alert means connected to said deviation determining means for producing an alarm signal in response to the output of said deviation determining means.

2. A doze prevention system as claimed in claim 1 wherein said eyeblink detecting means includes means for measuring a peak value, a rising slope, and a falling slope of each eyeblink pulse as extracted parameters.

3. A doze prevention system as claimed in claim 1 wherein said awake-state parameter generating means includes means for determining and recording a mean value and a variance value of the awake-state parameter pattern.

4. A doze prevention system as claimed in claim 2 wherein said awake-state generating means includes means for determining and recording respective mean values of the peak values, the rising slopes and the falling slopes of the awake state eyeblink pulses, and for determining and recording a covariance of the peak values, the rising slopes and the falling slopes of the awake-state eyeblink pulses, said mean values and said covariance forming the awake-state parameter pattern.

5. A doze prevention system as claimed in claim 4 wherein said deviation determining means includes means, operated when (1) the peak value of the monitor-for-doze eyeblink pulse is less than the recorded mean peak value, (2) the rising slope of the monitor-for-doze eyeblink pulse is less than the recorded mean rising slope, and (3) the falling slope of the monitor-for-doze eyeblink pulse is greater than the recorded mean falling slope, for calculating when a vector of the differences of the peak value, the rising slope and the falling slope of the monitor-for-doze eyeblink pulse from the respective recorded mean values is greater than the recorded covariance by a predetermined value to generate the output.

* * * * *